UNITED STATES PATENT OFFICE.

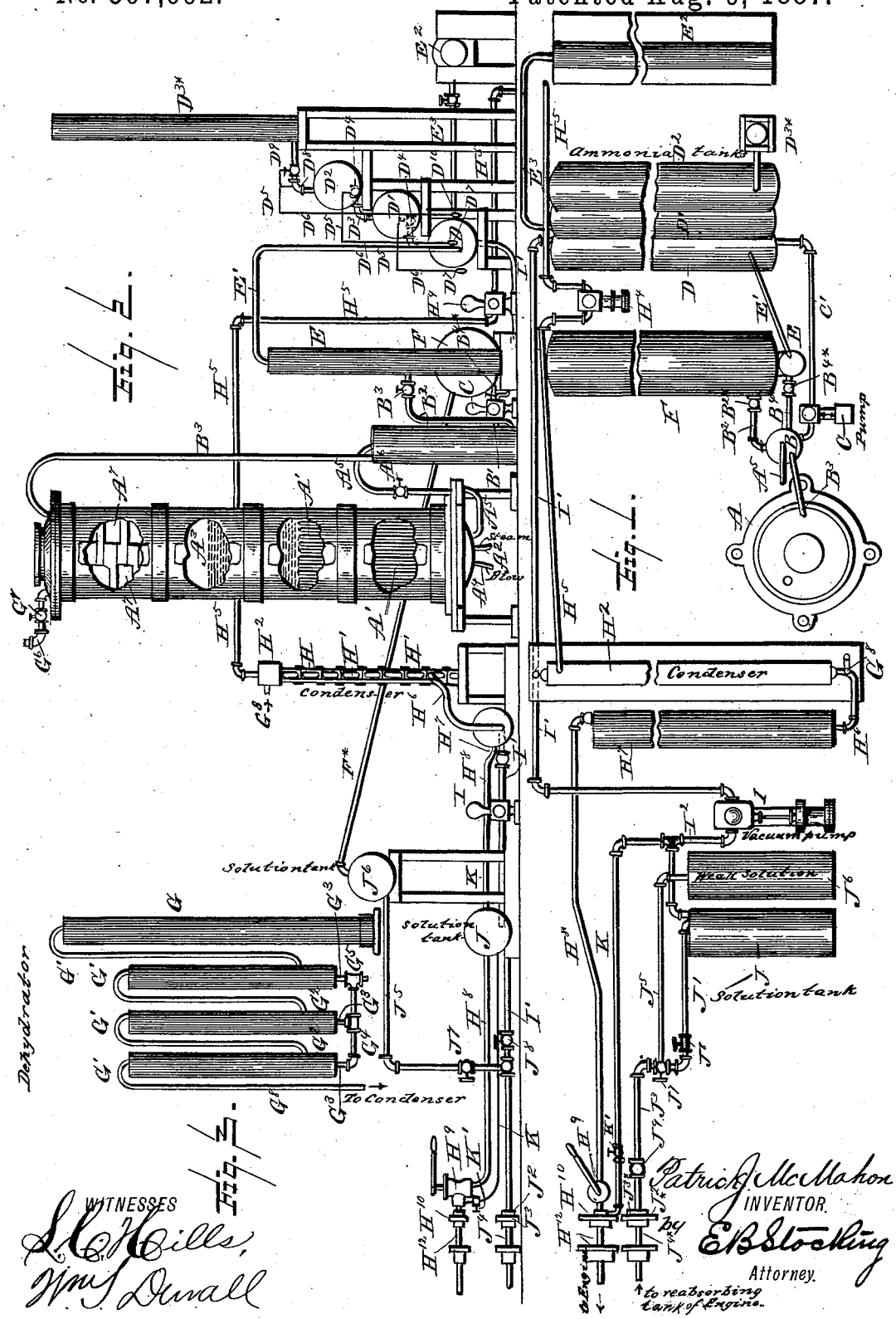

PATRICK J. McMAHON, OF NEW ORLEANS, LOUISIANA.

PROCESS OF PREPARING ANHYDROUS AMMONIA.

SPECIFICATION forming part of Letters Patent No. 367,992, dated August 9, 1887.

Application filed August 14, 1886. Serial No. 210,959. (No model.)

*To all whom it may concern:*

Be it known that I, PATRICK J. MCMAHON, a citizen of the United States, residing at New Orleans, in the parish of Orleans, State of Louisiana, have invented certain new and useful Improvements in Methods of Preparing, Using, and Purifying Anhydrous and Solutions of Ammonia for Motive Power, Refrigerative, and other Purposes, of which the following is a specification, reference being had therein to the accompanying drawings.

This invention has relation to the utilization of ammoniacal gas as a motive power and as an agent in refrigerating processes; and among the objects of my invention are to subject ordinary aqua-ammonia to such a treatment as shall produce therefrom a more pure or strictly anhydrous ammonia for the uses specified, and to subject to treatment the reabsorbing liquid used to receive the anhydrous ammonia after the same has been employed as a motive power in ammonia-engines and similar apparatuses, which treatment shall separate and restore therefrom a more pure or condensed anhydrous ammonia than hitherto, and during the treatment above mentioned to separate from the ammoniacal gas any air which may have been commingled therewith, or which may have entered the apparatus without liberating with said air any material portion of the gas within the apparatus, and, finally, to purify the ammonia solution from any oils or other impurities with which the said solution may have become contaminated in passing through the mechanical structure employed in utilizing the ammonia as a motive power.

Further objects and advantages of my invention will appear in the following description, and the novel features thereof will be particularly pointed out in the claims.

My invention involves, in fact, not only an apparatus adapted to perform the several operations hereinafter described, but also certain specific portions of the apparatus which are capable of use in connection with other apparatus than that herein shown; and my invention also involves a particular manner or method of treating aqua-ammonia for the purpose specified, which manner or method is not necessarily the only manner or method of using the apparatus shown and described, and therefore is something more than the mere operation of said apparatus, so that I do not limit my invention in regard to said method to practicing the same by means of an apparatus constructed in all substantial particulars like that herein shown and described.

Novel subject-matter herein shown and described is not claimed, as it is presented in a companion application filed herewith.

Referring to the drawings, Figure 1 is a plan. Fig. 2 is a side elevation of an apparatus constructed in accordance with and adapted to the practice of my invention. Fig. 3 is a side elevation of the dehydrator, its coupling $a$ being adapted to fit the coupling $a'$ of the still, for the purpose of supporting the dehydrator upon the still, and its pipe $G^8$ communicates with the pipe $G^6$ on the still.

Like letters refer to like parts in all the figures.

As a means for vaporizing aqua-ammonia, I employ a boiler or still, A, which comprises a system of steam-pipes, A', supplied from any suitable steam-generator through a pipe, $A^2$, at the bottom of the still. Within the still a supply of aqua-ammonia is maintained to submerge the steam-pipes and cover the same to about the depth indicated by the dotted lines $A^3$. From the bottom of the retort there is a discharge-pipe, $A^4$, for condensed water, and from the same part of the retort another pipe, $A^5$, provided with a valve, $A^6$, extends into an equalizer or heater, B. A pump, C, is connected with the equalizer B by a pipe, B', and by another pipe, C', (see Fig. 1,) with the lower one of a series of two or more ammonia-tanks, D D' $D^2$, connected with each other by pipes $D^3$, having within each tank a check-valve, $D^4$, which, by means of suitable lever-connections $D^5 D^6$ and handles $D^7$ thereon, may be opened to allow a free passage of ammonia from one tank to another. A similar pipe, $D^8$, and valve $D^9$, operated by a handle, $D^{10}$, affords communication from the upper tank, $D^2$, with a water-column, $D^{**}$, arranged at a point above the upper tank, so that liquid will pass from the water-column down through the several tanks in the series. Another pipe, $B^2$, communicates with the tank F, and still another pipe, $B^4$, gives communication between the equalizer and the vertical blow-off tank E, each of these pipes being provided with stop-cocks B²* B⁴*, and by means of a pipe, E', extending from the top of the blow-off tank, communication is had with the lower tank, D, of the series above mentioned, the pipe E' passing in to near the bottom of said tank.

The upper part of the still A is provided with a series of drip-shelves, A⁷, which are preferably quarter-sections of disks or quadrangular shelves arranged to overlap each other, so as to form a series of intercepting plates, in order that liquid admitted in the upper part of the retort may drip down the successive plates of the series.

B represents a pipe extending from the top of the equalizer to the top of the still, and serves to supply liquid at such a point that the same will drip from one plate A⁷ to another in the series shown. These plates constitute what may be termed the rectifying portion of the still.

Upon the still A, I mount a drier or dehydrator comprising a vertical column, G, from the top of which extends a pipe, G', which communicates with a column, G², near its bottom, which column is in turn provided with a similar pipe, G', communicating in a like manner with another column. These columns and pipes may be increased in number to any desired extent, and each is provided at its bottom with an outlet, G³, communicating with a connecting-pipe, G⁴, which communicates with a drip-pipe, G⁵, which is connected by means of a pipe, G⁶, having a valve, G⁷, with the upper portion of the still. From the top of the last column, G², of the series of dehydrators there extends a pipe, G⁸, to a condenser, comprising a coil, H, arranged in a vertical case, H', which is provided at its top with a tank, H², having its bottom perforated, so that by means of a pump, H⁴, and pipes H⁵ a supply of cold water may be caused to circulate around the coil H. From the coil a pipe, H⁶, extends to a tank, H⁷, and from this tank there extends a pipe, H⁸, provided with a valve or cut-off, H⁹, of any ordinary construction. At the end of the pipe H⁸ is a coupling, H¹⁰, the opposite member, H¹¹, of which is secured to a pipe, H¹², which communicates with the ammonia-reservoir of a motor, or it may be with any part of a refrigerating apparatus intended to receive the ammoniacal refrigerative agent employed.

I is a vacuum-pump, connected by means of one pipe, I', (see Fig. 1,) to the lower ammonia-tank, D, and by another pipe, I², with a solution-tank, J, from which a pipe, J', extends to a coupling, J², the companion element, J³, of which is secured to a pipe, J²*, communicating with the reabsorbing-liquid tank of a motor or refrigerating apparatus. Intermediate the tank J and coupling J² and the pipe J³, to which said coupling is secured, is a branch pipe, J⁴, (see Fig. 1,) from which there extends a pipe, J⁵, to an elevated solution-tank, J⁶. The branch pipe J⁴ is provided with a valve, J⁷, the pipe J' with a valve, J⁸, and the pipe J³ with a valve, J⁹. Between the valve H⁹ and coupling H¹⁰ there is a small pipe, K, having a valve, K', which pipe communicates with the pump I.

The mode of operation is as follows: The still A is filled with concentrated aqua-ammonia, so as to submerge the tubes, and above the same, as shown by dotted lines A³. Steam is admitted through the pipe A² into the tubes, and through them heating the concentrated solution surrounding them and evaporating the ammonia or expelling it as a gas, which rises into the drier G, and from thence passes through the dehydrators G². The aqueous vapor, condensing, falls to the bottoms of the columns constituting the dehydrators, and is finally collected at the drip-pipe G⁵, and is conducted through the pipe and valve G⁶ G⁷ into the reservoir, where it drips over the rectifying-plates A⁷ and joins the solution in the still to be again treated. The gas then passes from the last column or dehydrator through the pipe G⁸ into the condensing-coil H, where the heat given to it in the still is taken up by a body of water supplied by the pump H¹ to the tank H², the bottom of which is perforated to permit of the passage of water over the coils, so that the gas therein is condensed to a liquid—that is, to a purified anhydrous ammonia—which is collected in the tank H⁷, from which it is conducted by the pipe H⁸ to the pipes for use in the manner hereinafter described. The feed-pump C takes a supply of aqua-ammonia from the tank D and keeps up the level in the still A, through the equalizer B and feed-pipe B³, from which it drips down over the rectifiers A⁷. The ammonia being about all driven out of that portion of the still near the bottom, a continuous blow-off or discharge thereof is maintained through the pipe A⁵, equalizer B, and pipe B⁴ into the vertical blow-off tank E, valves A⁶* and B¹* being provided to control said blow-off. When the weaker solution thus discharged arrives in the vertical blow-off tank, it is there released from pressure, and the heat due to the higher pressure in the still is liberated and expels any remaining gas in the solution, and this gas passes through the pipe E' into the tank D, where it is absorbed, thus increasing the strength of the solution therein, as well as reducing the strength of that which is blown off or discharged into the tank E, which solution settles into the weak-solution tank F, from which, by a suitable pipe, F*, Fig. 1, it may be conducted from time to time to the weak-solution tank J⁶, from which supplies of the same may be furnished to a refrigerative or motor apparatus, in the manner to be now described.

To charge the car-motor or other apparatus, the couplings H¹⁰ H¹¹ are connected with the ammonia receiver or generator, and the couplings J² J³ are connected with the reabsorbing or weak-solution tank, the former to be charged from the tank H⁷ and the latter to be charged from the tank $J^6$, and both to be emptied by means of the tank J and its connection. Before the couplings are disconnected a vacuum is produced between the couplings $H^{10}$ $H^{11}$, $J^2$ $J^3$, and similar couplings on the motor or apparatus to be supplied by opening the connections between the tank J and the pipes communicating with the couplings. In the system of pipes communicating with the weak-solution tank of the apparatus to be supplied, the valves $J^8$ and $J^9$ are opened and the valve $J^7$ closed, when the solution in said tank (which, it is understood, has become more or less saturated with gas in the operations to which it has been subjected in a use of the motor or other apparatus) is drawn into the tank J by reason of the vaccum maintained therein by the pump I. On the other hand, the valve $H^9$, which controls the supply of the anhydrous ammonia from the tank $H^7$ to any apparatus which is to be supplied, is closed, and the valve $K'$ in the pipe K is opened, whereby the liquid ammonia from the tank or generator of the apparatus, together with any air or other impurities which have collected therein, is also conducted into the tank J. It naturally follows that by the connections arranged as just described not only are the contents of the tank or generator removed, but also that a vacuum is produced in them and in the pipes connecting the same with the couplings. The valves $K'$ and $J^8$ are now closed, and the valve $J^7$ is opened to permit the entrance of a fresh supply of the weak solution from the tank $J^6$, and the valve $H^9$ is opened to furnish a fresh supply or charge of anhydrous ammonia from the tank $H^7$. When supplied, these valves are closed and the couplings separated, and the operation of supplying has been accomplished with a removal of air from the apparatus supplied and a prevention of the introduction of air into the anhydrous-ammonia storage-tank and other parts of the apparatus from which it is desired to prevent its introduction. The pipe K, which is used merely to produce an exhaust in the pipes between the couplings—that is to say, to exhaust the air from the pipes which connect the motor or apparatus to be supplied with the apparatus herein shown—is connected directly to the pump I, thereby avoiding the introduction of air alone directly into the tank J. The main supply of concentrated ammonia is put into the tanks D $D'$ $D^2$, and water is put into the vertical tank $D^{}$, which is elevated above the ammonia-tanks and connected therewith, as described. When a charge of concentrated solution—that is, a quantity of water which is fully charged with ammonia—is withdrawn from a car-motor or other apparatus, it is pumped directly into the lower tank, D, and any gas withdrawn by the vacuum-pump I may be forced through also, as well as any air received from the pipes. If the solution in the tank D be not already saturated, it will absorb this gas. Otherwise the gas will pass upwardly through the check-valve $D^4$ into the tank $D'$, and, if necessary, into the tank $D^2$, and the air taking the same course will pass the check $D^9$ and through the water in the column $D^3$, where it will escape into the atmosphere, while any gas which might follow the air that distance will be retained and absorbed by the water in said tank $D^{}$. This refers more particularly to the air which is in the pipes before coupling, which air must be gotten rid of.

When it is desired to get additional solution in the tank D for feeding the still A, the check-valve $D^4$ is raised by means of the levers $D^5$ $D^6$ and handles $D^7$, and the required amount is run down from the tank $D'$. In a like manner the latter tank may be replenished from the next tank, $D^2$, above by manipulating the handle $D^7$, and by means of the handle $D^{10}$ and its connections with the check $D^9$ the water in the column $D^3$ may be introduced into the upper tank when said water has become sufficiently saturated. A new supply of water is provided in the tank $D^3$ to take the place of that removed.

While utilizing gas in the cylinder of a motor it takes up the black oil used for lubrication (and other impurities) and carries it off in the reabsorbing solution, rendering it black and dirty. This impurity is eliminated from time to time by taking a portion of the weak solution into the small boiler $E^2$ and heating the same therein until all the ammonia is expelled from it as a gas, a suitable connecting-pipe (not shown) being provided from the tank J to the boiler $E^2$, and a pipe, $E^3$, from the boiler to the tank D, the latter to conduct the gas separated from the impure weak solution. After the expulsion of the ammonia the dirty residuum is withdrawn from the boiler and may be thrown away; but if any traces of ammonia still remain in it it can be utilized as a fertilizer. The amount of weak solution withdrawn into the boiler E should be replaced by an amount of water in the vertical tank $D^3$, which will render the density of the solution in use the same as before withdrawal and wastage, as above specified—that is to say, the gas produced by the dirty residuum (thrown away) increases the strength of the liquid in the apparatus, and sufficient water must be added to that liquid to restore the normal density of the liquid in use.

Having described my method and one form of apparatus for practicing the same, what I claim is—

1. The method of charging a motor or other apparatus with anhydrous ammonia, which consists in exhausting the air in the portion of the connecting-pipes which is separated by valves from the motor and from the supply-tank, and subsequently shutting off communication of said pipes with the exhaust-pipe and opening up communication between the supply-tank and the connecting-pipe, substantially as specified.

2. The method of removing impurities taken up by the reabsorbing liquid of a motor or other apparatus and of maintaining a uniform strength of the liquid ammonia employed in the system, which consists in heating the same to expel the gases therefrom and conducting said gases to the ammonia-tank, discharging the residuum, and adding to the liquid in the system water sufficient to absorb the quantity of gas collected from the reabsorbing liquid, substantially as specified.

3. The method of producing anhydrous ammonia for motive or refrigerative purposes, which consists in evaporating concentrated ammonia, separating the weaker solution resulting from said evaporation and conducting it to a receptacle, and continuously and directly conducting any aqueous vapors arising therefrom to and re-evaporating the same with the concentrated ammonia being treated, substantially as specified.

In testimony whereof I affix my signature in presence of two witnesses.

PATRICK J. McMAHON.

Witnesses:
J. W. DAVIS,
E. C. KELLY.